US007986928B2

(12) United States Patent
Rokusek et al.

(10) Patent No.: US 7,986,928 B2
(45) Date of Patent: Jul. 26, 2011

(54) METHOD AND APPARATUS FOR SELECTING A RADIO CHANNEL FOR TRANSMITTING AN AUDIO SIGNAL TO A RADIO LOCAL RECEIVER

(75) Inventors: Daniel S. Rokusek, Long Grove, IL (US); Gary L. Christopher, Fox River Grove, IL (US); Peter A. Kindinger, Cary, IL (US); David A. Vanyek, Libertyville, IL (US); Kevin L. Weirich, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 577 days.

(21) Appl. No.: 11/952,497

(22) Filed: Dec. 7, 2007

(65) Prior Publication Data
US 2009/0149143 A1 Jun. 11, 2009

(51) Int. Cl.
*H04B 1/18* (2006.01)
(52) U.S. Cl. .................. 455/150.1; 455/3.06; 455/3.04; 455/67.11; 340/825.07; 701/117
(58) Field of Classification Search .......... 455/150.1, 455/3.06, 3.04, 67.11, 67.17, 562, 62, 63.3, 455/154.1; 340/825.07; 701/117
See application file for complete search history.

(56) References Cited

U.S. PATENT DOCUMENTS

| | | | | |
|---|---|---|---|---|
| 4,072,886 A | * | 2/1978 | Dammeyer | 318/602 |
| 4,969,207 A | * | 11/1990 | Sakamoto et al. | 455/134 |
| 5,073,900 A | * | 12/1991 | Mallinckrodt | 370/320 |
| 5,233,654 A | * | 8/1993 | Harvey et al. | 725/135 |
| 5,339,330 A | * | 8/1994 | Mallinckrodt | 370/320 |
| 5,475,862 A | * | 12/1995 | Sawyer | 455/435.2 |
| 5,867,794 A | | 2/1999 | Hayes et al. | |
| 6,108,561 A | * | 8/2000 | Mallinckrodt | 455/522 |
| 6,163,711 A | | 12/2000 | Juntunen et al. | |
| 6,304,764 B1 | | 10/2001 | Pan | |
| 6,311,065 B1 | * | 10/2001 | Ushiki et al. | 455/440 |
| 6,438,561 B1 | * | 8/2002 | Israni et al. | 1/1 |
| 6,990,407 B1 | * | 1/2006 | Mbekeani et al. | 701/117 |

(Continued)

FOREIGN PATENT DOCUMENTS

EP 1052834 A 11/2000

(Continued)

OTHER PUBLICATIONS

Kensington—Digital FM Transmitter/Auto Charger for iPod http://us.kensington.com/html/6402.html—Dec. 7, 2007.

(Continued)

*Primary Examiner* — Minh D Dao
(74) *Attorney, Agent, or Firm* — Scott M. Garrett; Sylvia Chen

(57) ABSTRACT

A transmitter device (100) receives an audio signal from an audio source device (112), and transmits the audio signal at a low power over a commercial broadcast channel to a local receiver (120). The transmitter device selects an initial channel by scanning the available spectrum, partitioned into sub-bands (210-206), and measuring the received signal strength in each channel. The channel having the lowest strength is used to set a threshold. The sub-band with most channels meeting the threshold is initially selected, and the channel in the initially selected sub-band with the lowest received signal strength is selected for initial use. A context-based weighting factor may be applied in selecting the initial channel or in selecting subsequent channels when the initial channel conditions degrade.

20 Claims, 5 Drawing Sheets

U.S. PATENT DOCUMENTS

| | | | |
|---|---|---|---|
| 7,027,808 B2 * | 4/2006 | Wesby | 455/419 |
| 7,072,686 B1 | 7/2006 | Schrager | |
| 7,643,787 B2 * | 1/2010 | Ukai | 455/3.02 |
| 7,668,138 B2 * | 2/2010 | Abedi | 370/331 |
| 7,769,344 B1 * | 8/2010 | Harvey et al. | 455/39 |
| 2002/0086716 A1 | 7/2002 | Pan | |
| 2003/0036357 A1 | 2/2003 | McGowan | |
| 2003/0236075 A1 | 12/2003 | Johnson et al. | |
| 2004/0204158 A1 | 10/2004 | Wang et al. | |
| 2004/0204163 A1 | 10/2004 | Ou | |
| 2005/0075095 A1 | 4/2005 | Dillon | |
| 2005/0143139 A1 | 6/2005 | Park et al. | |
| 2006/0009245 A1 | 1/2006 | Hur et al. | |
| 2006/0023656 A1 * | 2/2006 | Anglin | 370/328 |
| 2006/0035641 A1 * | 2/2006 | Moon et al. | 455/448 |
| 2006/0058054 A1 * | 3/2006 | Hiramatsu | 455/522 |
| 2006/0223467 A1 | 10/2006 | Mason | |
| 2006/0280270 A1 | 12/2006 | Ibrahim et al. | |
| 2006/0293007 A1 | 12/2006 | Kim | |
| 2007/0004415 A1 * | 1/2007 | Abedi | 455/442 |
| 2007/0014536 A1 * | 1/2007 | Hellman | 386/94 |
| 2007/0197263 A1 | 8/2007 | Gudmand-Hoyer | |
| 2008/0167047 A1 * | 7/2008 | Abedi | 455/442 |
| 2008/0214238 A1 | 9/2008 | Rokusek et al. | |
| 2010/0198692 A1 * | 8/2010 | Hotta et al. | 705/14.62 |

FOREIGN PATENT DOCUMENTS

| | | |
|---|---|---|
| GB | 2330487 A | 4/1999 |
| KR | 1020070073374 A | 7/2007 |
| WO | WO0163889 A1 | 8/2001 |
| WO | WO03052947 A2 | 6/2003 |

OTHER PUBLICATIONS

Patent Cooperation Treaty, "Notification of Transmittal of the International Search Report and the Written Opinion of the International Searching Authority, or the Declaration" for PCT/US2008/084167, May 26, 2009, pp. 1-11.

Patent Cooperation Treaty, "Notification of Transmittal of the International Search Report and the Written Opinion of the International Searching Authority, or the Declaration" for International Application No. PCT/US2008/051543, May 23, 2008, pp. 1-13.

United States Patent and Trademark Office, "Final Office Action Summary" for U.S. Appl. No. 11/680,897, Jul. 22, 2010, pp. 1-11.

United States Patent and Trademark Office, "Office Action Summary" for U.S. Appl. No. 11/680.897, Feb. 8, 2010, pp. 1-10.

* cited by examiner

| 87.5 | 87.7 | 87.9 | 88.1 | 88.3 | 88.5 |

TIME OF DAY
LENGTH OF TIME
LOCATION

METHOD AND APPARATUS FOR SELECTING A RADIO CHANNEL FOR TRANSMITTING AN AUDIO SIGNAL TO A RADIO LOCAL RECEIVER

FIELD OF THE INVENTION

The invention relates generally to transmitter devices which transmit audio information or signals to a local commercial radio receiver, and more particularly to methods of finding unused channels on which to broadcast from the transmitter device to the commercial radio receiver.

BACKGROUND OF THE INVENTION

There is a wide variety of portable electronic devices which render audio signals in the marketplace today. Among the more popular device there are cellular phones, mp3 players, hand held video game consoles, and so on. These devices are often used by people while operating motor vehicles. To provide a safe user experience while using these devices in vehicles, manufactures have sought to develop hands-free operating modes so that the user does not have to hold the device while operating the vehicle. Some vehicles are provided with a personal area wireless network interface to allow similarly-enabled devices to transmit signals over a personal area network link to the vehicle audio system, which plays the audio signals. However, that requires both the device and the vehicle to have the appropriate components to support personal area networks.

Presently, most vehicles are not equipped with personal area network capability. However, the vast majority of vehicles do have audio systems including commercial broadcast FM radio receivers. This has given rise to a market for FM transmitter devices which connect to a portable device, and transmit an audio signal from the transmitter device over a radio channel to the vehicle's radio receiver. For various reasons, the FM band is most commonly used. Conventionally, the FM transmitter device receives the audio signal via a wired connection, such as a headphone jack. However, unlike with vehicles, personal area and local area network capability is increasingly prevalent in electronic devices, which allows for the opportunity of a wireless link between the transmitter device and the communication or computing source device, provided the transmitter device is equipped with a wireless interface for receiving the signal from the source device.

The designs of such FM transmitter devices vary substantially. Inexpensive models may have user-selectable channels settings which allow a user to select one of a small number of available channel settings, such as by a switch. Typically one or more of the selectable channels will be sufficiently clear of commercial broadcast signals to facilitate acceptable quality between the FM transmitter device and the vehicle's FM receiver. In congested urban areas, however, there may be substantial interference on all of the few selectable channels on these low complexity models. Some models allow a user to select any channel in the FM band, necessitating the user know where to find an unused channel. These type of transmitter devices also force the user to make a decision as to whether a given channel is sufficiently free of commercial FM broadcast signals by listening to the channel. The human ear is a poor judge of RF signal strength, due to the threshold effects with FM modulation. This makes it difficult for a user to manually select a weak channel suitable for the transmitter.

More complex FM transmitter devices may comprise a simple FM receiver to scan the available commercial radio band to find unused channels, and then tune the transmitter to an unused channel. It is known to simply scan the entire band and select the channel with the lowest received signal strength, or scan until a channel with a received signal strength below a defined threshold is found and use that channel. While these type of FM transmitter devices will usually find clearer channels than may be available with simpler FM transmitters that do not scan, the selected channel quality may degrade faster than other suitable channels depending on the movement of the vehicle, necessitating the user to prompt a rescan when the audio quality degrades to an unacceptable level due to interference, such as from commercial broadcasts on the selected channel. Often the new channel selection is far away from the present channel, which may require many button presses by the user to tune in the new channel. Therefore there is a need for a more effective way of selecting a radio channel for transmitting to a nearby radio receiver.

SUMMARY OF THE INVENTION

The present invention discloses in one embodiment of the invention a method of selecting an FM radio channel for broadcasting a signal to a FM receiver by an FM transmitter device. The method may commence by initially scanning an available FM band to determine signal strength in each of a plurality of FM channels. The FM band scan may be partitioned into a plurality of sub-bands while scanning. Upon completing the scanning, the method commences by identifying the channel having the lowest channel signal strength value. An initial sub-band is then selected by identifying the sub-band having the highest number of channels with a received signal strength within a threshold offset of signal strength of the channel having the lowest channel signal strength. Within the selected sub-band, the channel with the lowest channel signal strength is selected for initial transmission, and the method commences transmitting an audio signal on the selected FM channel.

In a further embodiment of the invention, the invention provides a method of selecting an FM radio channel for transmitting from a transmitter device, commencing by providing in the transmitter device a channel use history, stored in a memory of the transmitter device. The method commences by receiving an input to select a channel, or select a new channel. The input may be received from a user of the transmitter device. The transmitter device then commences scanning the commercial FM band to identify a plurality of candidate FM channels. The transmitter device then commences generating a weighting factor for each of the plurality of candidate FM channels to provide a plurality of weighted FM channels, wherein the weighting factor for each of the plurality of candidate channels is based at least in part on a present signal condition and a channel use history of the candidate FM channel. A channel is then selected from among the plurality of weighted FM channels, and the transmitter device then commences transmitting an audio signal received from an audio source device over the selected channel.

BRIEF DESCRIPTION OF THE DRAWINGS

There are shown in the drawings, embodiments which are presently preferred, it being understood, however, that the invention is not limited to the precise arrangements and instrumentalities shown.

FIG. 4 shows a context memory map relating channels with use context, in accordance with an embodiment of the invention.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
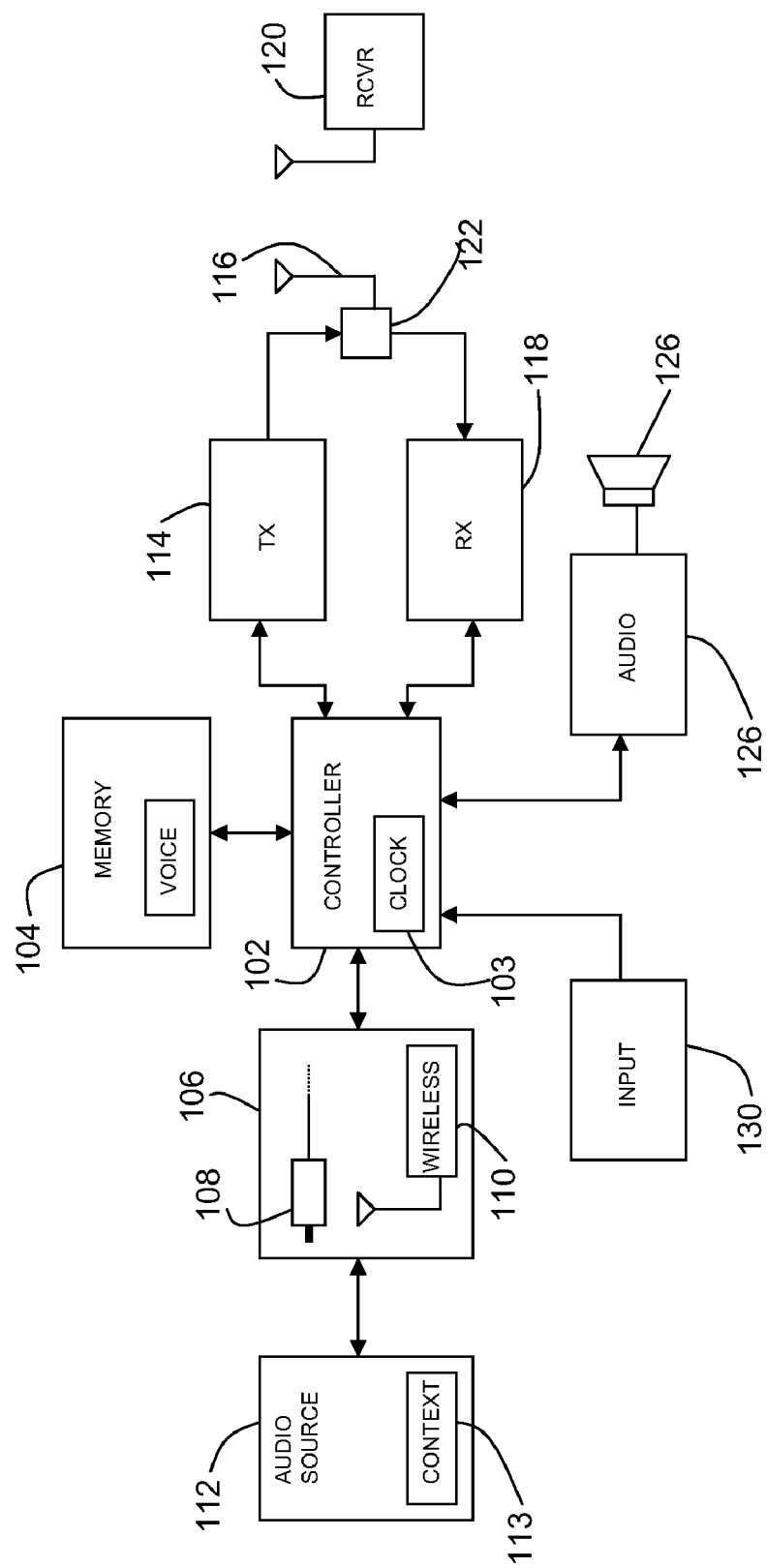
FIG. 1 shows a block schematic diagram of a low power radio audio transmitter device, in accordance with an embodiment of the invention.

Referring now to FIG. 1, there is shown a block schematic diagram of a transmitter device 100, in accordance with an embodiment of the invention. The transmitter device generally receives an audio signal from a local source and transmits the audio signal over a commercial broadcast radio channel at a power level allowed by applicable governmental regulations so that the signal may be received by a nearby commercial broadcast radio receiver. Such transmitter devices are commonly used, for example, in automotive environments to allow users to play audio signals over the automobile's FM receiver. The audio signal may be provided by a compact disc player, mp3 player, or cellular phone device, for example. The transmitter device allows the user to hear the audio signal over the vehicle's audio system via the FM receiver, thereby obviating the need for headphones.

The transmitter device comprises a controller 102 for controlling operation of the transmitter device, responsive to user input and instruction code stored in a memory element 104. The memory may include a plurality of memory elements of a variety of forms, including read only memory, reprogrammable memory, flash memory, and so on. The transmitter device receives audio information via an audio interface 106, which may include a wired interface 108 such as a plug or jack, or a wireless interface 110 such as a personal area network interface. An example of a personal area network interface is that known in the industry by the trade name Bluetooth. The audio interface allows the device to receive audio and other information from an audio source 112. The audio source may be, for example, a compact disc player, mp3 player, cellular telephone, personal digital assistant, and so on. It is contemplated in one embodiment of the invention that the audio media may be stored in the transmitter device itself, such as in a memory of the transmitter device. Essentially any device which may provide stored or streaming audio content may be used as an audio source. The audio source 112 may further provide context information 113. Examples of context information include present time of day, date, location information, and so on. The controller 102 may maintain some information as well, such as, for example, a time of day clock 103. It is further contemplated that the transmitter device may include additional context generating components, such as a satellite positioning receiver. In one embodiment of the intention, the transmitter device may be incorporated into a vehicle navigation device, where it will have access to location information, and where it may be used to transmit voice synthesized driving directions to the vehicle's FM receiver.

The transmitter device receives audio information from the audio source, and transmits it via a low power radio transmitter 114 over an antenna 116. A nearby receiver 120 tuned to the same channel as the transmitter 114 can then receive the audio signal. In an embodiment of the invention, the transmitter is designed to transmit in a frequency band used by commercial broadcast radio, such as the radio spectrum from 87.5 MHz to 108 MHz, which is used for frequency modulated (FM) commercial broadcast radio in many regions of the world.

To determine a channel over which the transmitter device can transmit, it is provided with a receiver 118, coupled to the antenna 116 via a switch 122. The receiver can scan the entire frequency band and measure channel signal strength at each channel. The results of the scan are reported to the controller 102. Based on the results of the scan, the controller can select the best channel, in accordance with the invention, and inform the user so that the user can tune the receiver 120 to the same channel. It is further contemplated that the transmitter device may transmit the tuning information to the receiver via a digital sub-channel message, such as may be provided using Radio Data System or Radio Broadcast Data System compatible receivers. In an embodiment of the invention, the transmitter device is provided with an audio circuit 124 and a speaker 126 so that, among other things, the transmitter device can announce the selected radio channel, such as by voice synthesis using voice information 132 in the memory 104. Furthermore it is contemplated that the audio section may include a microphone to allow the transmitter device to facilitate speakerphone operation when the audio source is a cellular telephone. The transmitter device may additionally or alternatively have a visual display to display the selected channel. As the transmitter device is used through the course of travel, the originally selected channel may become unusable due to interference or the proximity of broadcasting entity. When that occurs, the audio signal transmitted by the transmitter device will become corrupted. An input device 130 allows the user to cause the transmitter device to select another clean channel. The input may be a button or other tactile mechanism, and may also allow users to input information, such as selecting a favorite channel.

Figure 2:
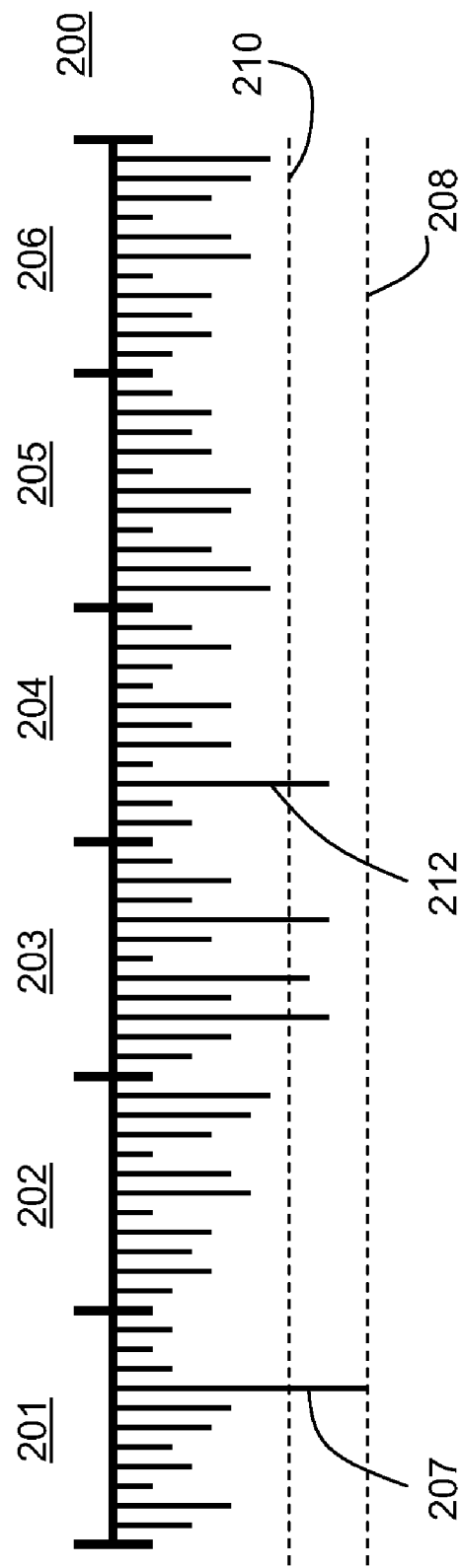
FIG. 2 shows an exemplary spectrum scan map of a radio spectrum band scan, in accordance with an embodiment of the invention.

Referring now to FIG. 2, there is shown an exemplary spectrum scan map 200 of a radio spectrum band scan, in accordance with an embodiment of the invention. The spectrum scan map represents a exemplary scan of the available radio spectrum band in which the transmitter device may operate, and an initial scan of the band to determine an initial channel. The band may be subdivided into sub-bands 201-206. The present example shows 6 sub-bands, but more or fewer may be used. The transmitter device tunes the receiver 118 to each available channel and measures the received signal strength to generate an indication of the radio activity on the present channel. It is common to use a received signal strength indicator (RSSI) measurement value. On the scan map in FIG. 2, the vertical lines represent the received signal strength in a given channel, where the lower the line goes, the lower the received signal strength on that channel. The results of the scan are stored in memory for further processing and evaluation. One channel 207 has the lowest received signal strength level 208. According to one aspect of the invention, the channel with the lowest received signal strength is determined, then an adjustment factor or threshold offset is added to that level to create a threshold 210. The sub-band with the most channels having a received signal strength at or below the threshold 210 is selected, and the channel with the lowest received signal strength in that sub-band is selected as the initial channel of operation. So, while one channel may have the lowest RSSI, it may not be the selected initial channel. By selecting a sub-band with the most channels meeting the threshold, rescanning time may be reduced if and when a presently used channel becomes unusable because of the likelihood of another suitable channel being nearby in frequency. Furthermore, it is contemplated that in performing the scan and identifying candidate channels, the channels adjacent a potential candidate channel may be examined and if either of the adjacent channels has a high signal strength, the channel under consideration may be excluded. For example, channel 212 meets the threshold criteria, but has an adjacent channel with a high signal strength. According to one embodiment of the invention, then, channel 212 would be excluded from consideration as a useable channel.

Figure 3:
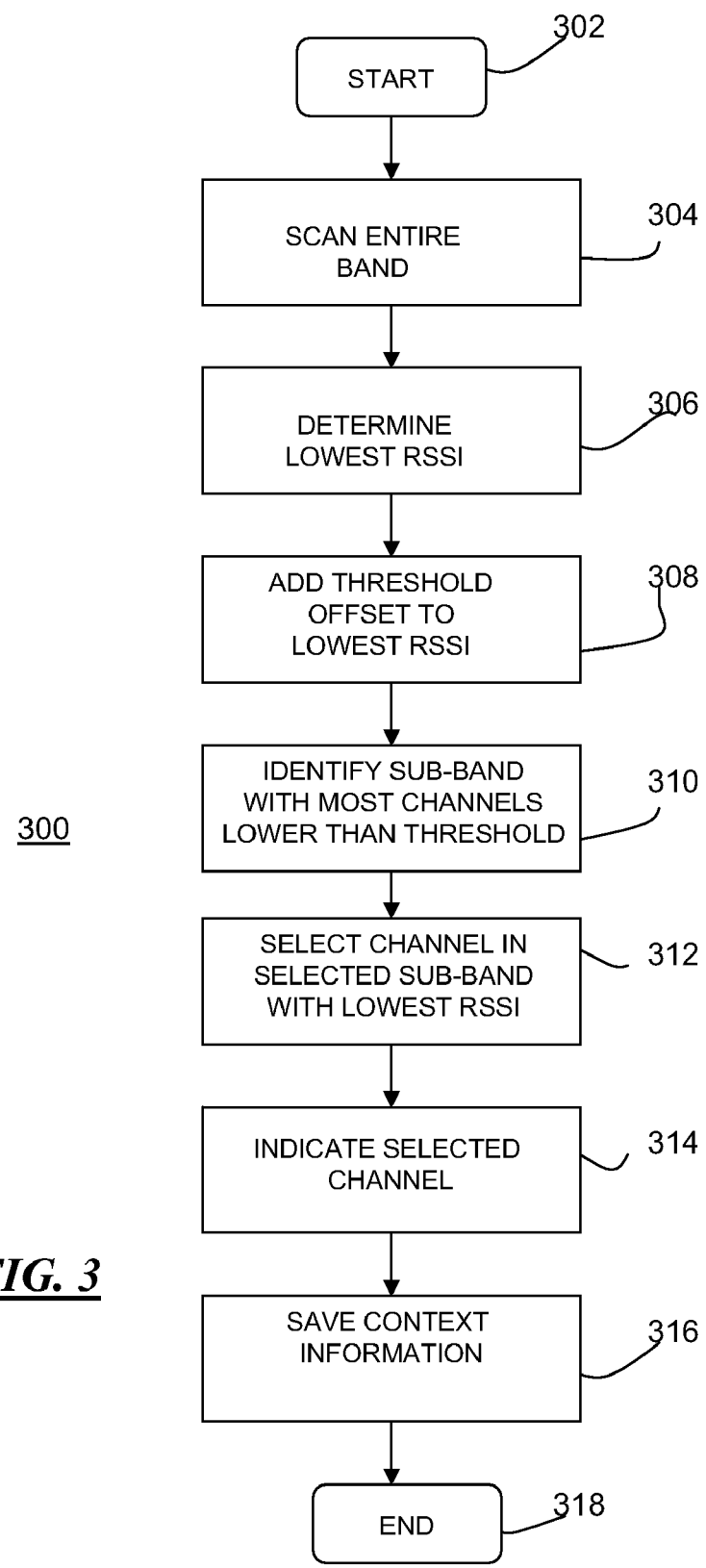
FIG. 3 shows a flow chart diagram of a method of selecting a radio channel over which to repeat a local audio signal, in accordance with an embodiment of the invention.

FIG. 3 shows a flowchart diagram 300 of a method for selecting an initial channel, in accordance with an embodiment of the invention. At the start 302, the transmitter device is powered on and commences a full band scan 304. Upon completing the scan, the channel with the lowest signal strength is determined 306, and a threshold offset is added to that RSSI value 308. The transmitter device then identifies the sub-band with the most channels having a signal strength at or below the threshold 310. From the selected sub-band, the channel in the selected sub-band with the lowest RSSI is selected 312. The transmitter device then indicates the selected channel 314, such as by announcing the selected channel using voice synthesis, for example. Finally, according to the invention, the transmitter device collects and stores context information 316 associated with the initial channel selection. The context information may be, for example the present time of day, present geographic location, whether the selected channel is a favorite, and so on. The context information may be used for future channel selections in addition to RSSI to reduce the likelihood of having to rescan. For example, depending on the direction of travel, a channel having the lowest RSSI upon the initial scan may degrade as the user and transmitter device travel on a routine route, such as traveling to or from a place of business or employment. However, another channel having a low RSSI, but not the lowest, upon the initial scan, may remain relatively clean during the same route. Thus, context information may allow the transmitter device to select a channel that results in fewer rescan requests by the user. At the end, the user can tune to the announced channel and commence listening to the audio content over the receiver 120.

Figure 4:
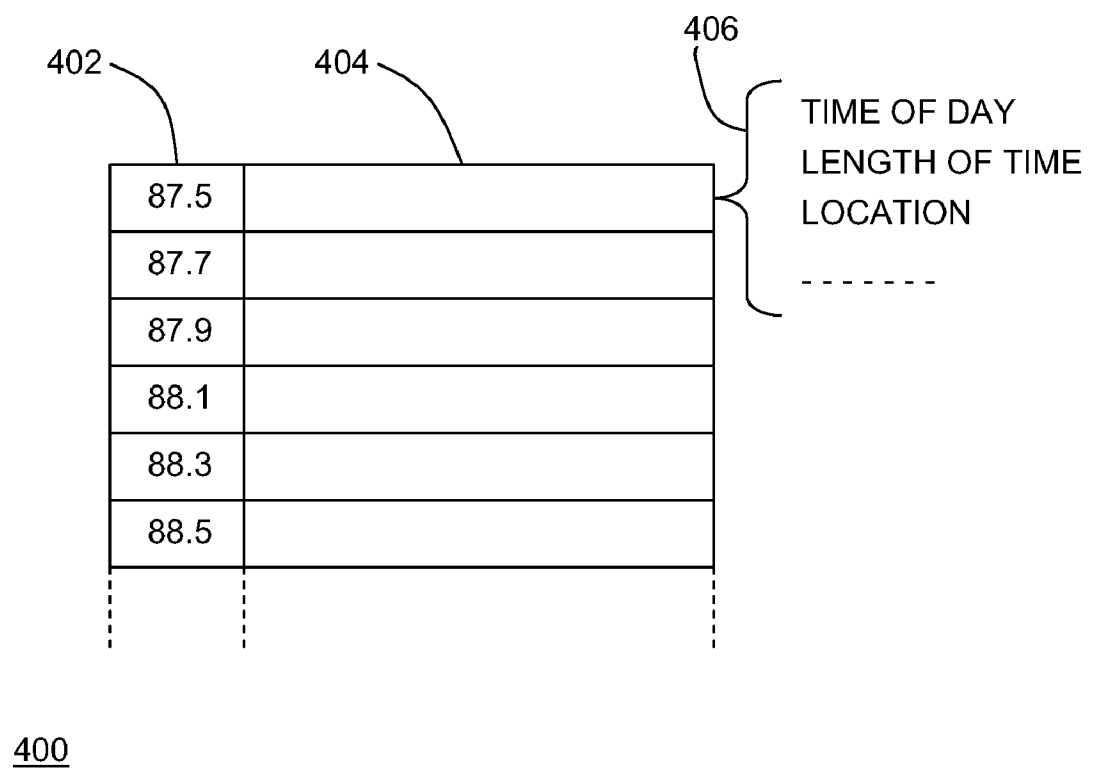

Referring now to FIG. 4, there is shown a context memory map 400 relating channels with use context, in accordance with an embodiment of the invention. The map is an abstraction of a data structure stored in the memory of the transmitter device for collecting context information relating to the different channels and may be embodied in a variety of conventional data structure formats. In the present example, there is a channel field 402 and a context field 404 associated with each channel field. The channel field stores an indicator corresponding to a particular channel or frequency. The context field is used to store additional information 406 such as the time of day when the channel was selected, the length of time the channel was used, the geographic location where the channel was selected, whether the channel is considered a "favorite" channel by the user, and so on. There are numerous contextual elements that may be used, depending on application and engineering preference. The information may be acquired directly by the transmitter device, such as time of day if the transmitter device is equipped with a clock, or it may receive information from the audio source device. For example, a cellular phone may be equipped with a personal area network interface and a satellite positioning receiver, as well as audio content. When the transmitter device performs a scan, it may query the cellular phone for the present geographic location, which is then stored in the context field associated with the selected channel. Subsequent channel selections may then be based on historical channel use for a given context, in addition to signal strength criteria.

Figure 5:
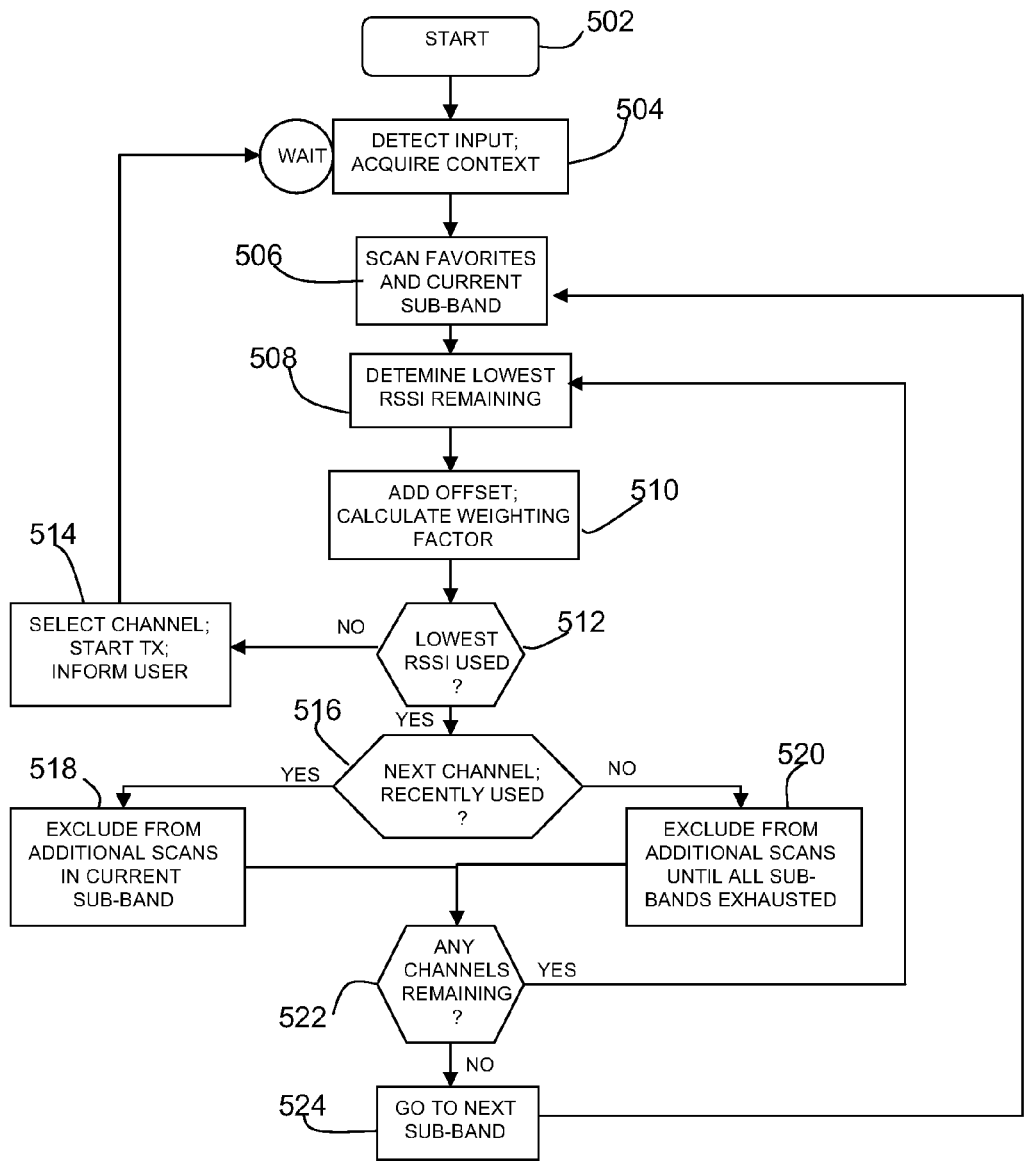
FIG. 5 shows a flow chart diagram of a method of selecting a new channel over which to repeat a local audio signal, in accordance with an embodiment of the invention.

Referring now to FIG. 5, there is shown a flow chart diagram 500 of a method for selecting a new channel over which to repeat a local audio signal, in accordance with an embodiment of the invention. At the start 502, the transmitter device has already commenced transmitting on a selected channel, and the user has detected that the presently selected channel has become degraded due to interference. To change to a new channel, the user may press a button or effect some other input 504. Upon detecting the user input the transmitter device may commence acquiring present context information. The present context information may be acquired by determining the present time of day, location, or any other relevant information. At the same time, usage information of the now-degraded channel may be recorded, such as the duration of use of the channel. The method then commences by scanning the presently selected sub-band 506, and any favorite channel selections stored in memory. Of the channels scanned in step 506, the channel with the lowest RSSI is determined 508. The value of the lowest RSSI is used to determine an acceptable threshold level by adding a threshold offset 510. The transmitter device may also determine a weighting factor based on the context information associated with the channels, and the present context parameters. The weighting factor for candidate channels may be based in part on channel use history or other context information as well as present channel signal conditions, such as RSSI. Once the threshold offset has been added to the lowest RSSI of the channel with the lowest RSSI, the method checks to see if the channel remaining with the lowest RSSI has been used recently 512. If not, then the method selects the channel remaining with the lowest RSSI 514 and begins transmitting on that channel and indicating the selected channel to the user. The method then waits in the present state, transmitting on the selected channel, until another user input is received. If the remaining channel with lowest RSSI has been used recently, or if the channel with lowest RSSI has a poor weighting factor, the method selects the next candidate channel 516 based on RSSI and weighting factor or context information. If the next selected channel is a "favorite" as indicated by previous user selection, since it was recently used it will be excluded from addition scans while using the present sub-band 518. If the presently selected channel is not a favorite, it is excluded from further scans until all the sub-bands have been exhausted 520. If there are more candidate channels remaining in the presently selected sub-band 522, the method returns to step 508 and considers the next candidate channel, based on RSSI, weighting factor, or both. If there are no more candidate channels remaining in presently selected sub-band, then the method changes to the next sub-band 524, which may be the next higher sub-band in the spectrum, and returns to step 506 to scan the new adjacent sub-band for candidate channels.

This invention can be embodied in other forms without departing from the spirit or essential attributes thereof. Accordingly, reference should be made to the following claims, rather than to the foregoing specification, as indicating the scope of the invention.

What is claimed is:

1. A method of selecting an FM radio channel for broadcasting a signal to an FM receiver by an FM transmitter, comprising:
   initially scanning an FM band to determine signal strength in each of a plurality of FM channels, wherein the FM band is partitioned into a plurality of sub-bands;
   identifying an FM channel having a lowest channel signal strength value;
   selecting an initial sub-band from the plurality of sub-bands having a highest number of candidate FM channels, the candidate FM channels having a signal strength within a threshold offset of signal strength of the FM channel having the lowest channel signal strength;
   selecting an initial FM channel in the initial sub-band having the lowest channel signal strength; and
   transmitting an audio signal on the initial FM channel.

2. A method of selecting an FM radio channel as defined in claim 1, further comprising indicating the initial FM channel subsequent to selecting the initial FM channel.

3. A method of selecting an FM radio channel as defined in claim 2, wherein indicating the initial FM channel comprises providing a graphical display of the initial FM channel.

4. A method of selecting an FM radio channel as defined in claim 2, wherein indicating the initial FM channel comprises providing a synthesized voice announcement of the initial FM channel.

5. A method of selecting an FM radio channel as defined in claim 1, further comprising:
   determining at least one usage parameter associated with the initial FM channel, wherein the at least one usage parameter includes at least one of a present location, a time of day, and a duration of use;
   generating a weighting factor based at least in part on the at least one usage parameter; and
   storing the weighting factor in association with the initial FM channel in a memory of the FM transmitter.

6. A method of selecting an FM radio channel as defined in claim 5, wherein generating the weighting factor is based at least in part on a previously determined weighting factor associated with the initial FM channel.

7. A method of selecting an FM radio channel as defined in claim 1, wherein the initial channel is a current channel and the initial sub-band is a current sub-band, further comprising:
   receiving a user input at the FM transmitter indicating the current FM channel is no longer suitable;
   selecting a new FM channel, comprising:
      scanning stored favorite FM channels and FM channels of the current sub-band;
      identifying new candidate FM channels from among the stored favorite FM channels and candidate FM channels in the current sub-band; and
      selecting a new FM channel from among any new candidate FM channels.

8. A method of selecting an FM radio channel as defined in claim 7, wherein selecting a new FM channel from among any new candidate channels is based at least in part on a weighting factor associated with the new FM channel.

9. A method of selecting an FM radio channel as defined in claim 8, wherein if no new candidate FM channels are found among the favorite FM channels and channels in the current sub-band, the method further comprises scanning in an adjacent sub-band for new candidate FM channels.

10. A method of selecting an FM radio channel as defined in claim 1, further comprising, after selecting the initial FM channel in the initial sub-band, transmitting an initial FM channel identifier over an FM sub-channel to the FM receiver.

11. A method of selecting an FM radio channel for low power broadcasting from a transmitter device, comprising:
   providing in the transmitter device a channel use history, stored in a memory of the transmitter device;
   receiving an input to select an FM channel;
   scanning an FM band to identify a plurality of candidate FM channels;
   generating a weighting factor for each of the plurality of candidate FM channels to provide a plurality of weighted FM channels, wherein the weighting factor for each of the plurality of candidate channels is based at least in part of a present signal condition and a channel use history of the candidate FM channel;
   selecting from among the plurality of weighted FM channels a present channel; and
   transmitting an audio signal received from an audio source device over the present channel.

12. The method of claim 11, wherein the channel use history includes a use duration parameter.

13. The method of claim 11, wherein the channel use history includes a time of day parameter.

14. The method of claim 11, wherein the channel use history includes a location parameter, the method further comprises receiving location information at the transmitter device indicating a present geographic location of the transmitter device.

15. The method of claim 14, wherein receiving location information comprises receiving location information from an audio source device.

16. The method of claim 15 wherein the audio source device is a mobile communication device including a satellite positioning receiver.

17. The method of claim 16 wherein receiving location information comprises receiving the location information over a wireless link with the mobile communication device.

18. The method of claim 11, wherein scanning an FM band comprises scanning a sub-band of an available FM broadcast spectrum which includes a presently selected FM channel.

19. A transmitter device, comprising:
   a controller,
   an FM transmitter;
   an FM receiver;
   a memory including instruction code for configuring the controller to:
      scan an FM band to identify a plurality of candidate FM channels using the FM receiver, wherein the FM band is partitioned into a plurality of sub-bands;
      generate a weighting factor for each of the plurality of candidate FM channels to provide a plurality of weighted FM channels, wherein the weighting factor for each of the plurality of candidate channels is based at least in part of a present signal condition and a channel use history of the candidate FM channel;
      select from among the plurality of sub-bands, a present sub-band having the most number of weighted FM channels meeting a preselected channel criteria
      select a present channel in the present sub-band having the best channel criteria; and
      transmit an audio signal over the present channel using the FM transmitter.

20. A transmitter device as claimed in claim 19, wherein the weighting factor includes at least a present geographic location of the transmitter device.

* * * * *